Patented Nov. 5, 1940

2,220,693

UNITED STATES PATENT OFFICE 2,220,693

ISOMERIZATION OF OLEFINS

Adrianus Johannes van Peski and Hermanus Frans Joseph Lorang, Amsterdam, Netherlands, assignors, by mesne assignments, to Universal Oil Products Company, Chicago, Ill., a corporation of Delaware No Drawing. Application June 5, 1937, Serial No. 146,594. In the Netherlands June 27, 1936

15 Claims. (Cl. 260—683)

This invention relates to the isomerization of olefins, and it relates more particularly to a process for the conversion of normal butenes to isobutene.

The principal object of this invention is to provide a practical and economical process in accordance with which the normal butenes (butene-1 and butene-2) are converted to the more valuable isobutene.

The process of the invention comprises contacting a normal butene, a mixture of normal butenes or a mixture, such as a hydrocarbon mixture, comprising one or both normal butenes with a catalyst consisting of or comprising a phosphorus oxy-acid at an elevated temperature, preferably equal to at least 250° C., for a time sufficient to effect substantial isomerization of the normal butene or butenes to isobutene but insufficient to effect substantial polymerization, whereby the normal butene or butenes is/are practically and economically converted to isobutene in good yields while losses of the butenes due to polymerization are substantially obviated.

The process of the present invention is of great technical importance because in accordance therewith isobutene, which valuable tertiary olefin serves as the starting material for the manufacture of a wide variety of commercially valuable chemical compounds, can be produced on a technical scale in a simple, practical and economical manner from the cheaper, less reactive, more readily available and much less valuable normal butenes.

It is known that the butenes, particularly isobutene, can be contacted with catalysts consisting of or comprising phosphoric acid under such conditions that the butenes are polymerized to higher molecular weight hydrocarbons. These polymerization processes are executed under conditions favorable to polymerization but under such conditions of temperature, pressure and contact time that no isomerization of normal butenes present in the reaction mixture can occur. The polymerization processes using phosphoric acid catalysts are executed at temperatures in all cases below 250° C., and preferably at temperatures below 200° C.; under superatmospheric pressures preferably as high as from 15 to 20 atmospheres; and with the butenes in contact with the catalyst under the above enumerated conditions of temperature and pressures for periods of time in all cases greater than ten minutes and preferably in the order of one hour or more. Thus, it is seen that prior investigators in the art of polymerizing butenes by contact with phosphoric acid catalyst did not discover that normal butenes could be isomerized to isobutene because they worked under conditions at which such isomerization cannot occur and because it was by no means predictable that by the use of radically different conditions of operation, that is, temperatures not below about 250° C., pressures not greater than about 5 atmospheres, and contact times not exceeding about one minute, a normal butene could be converted to isobutene in excellent yield while polymerization of the butenes is substantially obviated. Thus, it is seen that the process of the present invention, which process is drawn to the method of converting a normal butene to isobutene by isomerization, differs from the polymerization processes of the prior art, not only in the different products obtained, but in being executed under different conditions of temperature, pressure and contact time.

It is also known that butene-1

($CH_2=CH—CH_2—CH_3$)

can be isomerized to the other species of normal butene, namely butene-2 ($CH_3—CH=CH—CH_3$), by contact with a phosphoric acid-diatomaceous earth catalyst under conditions of temperature, pressure and contact time at which isomerization of the normal butenes to isobutene cannot occur. The processes in accordance with which butene-1 is isomerized to butene-2 are executed at temperatures below 250° C., under superatmospheric pressures of 7 atmospheres and higher, and with the butenes in contact with the phosphoric acid catalyst for periods of time in all cases greater than 83 seconds and preferably in excess of 200 seconds. Under these conditions, isomerization of the normal butenes to isobutene cannot occur; the prior investigators, in fact, reporting 100% conversion of butene-1 to butene-2.

The source of the normal butene or mixture of normal butenes used in the execution of our invention is immaterial. Pure butene-1 or pure butene-2, or mixtures thereof, or mixtures of one or both of the normal butenes with one or more saturated or unsaturated hydrocarbons as well as other substantially inert materials may be used as starting material. Thus, it is seen that the invention provides for the utilization of the normal butene-content of commercial hydrocarbon mixtures, particularly those resulting from the cracking of higher molecular weight hydrocarbons and hydrocarbon mixtures, such as petroleum oils, shale oils, petroleum products, animal oils, vegetable oils, coal, peat, waxes and the like. Normal butene-containing mixtures resulting from the catalytic dehydrogenation of normal butane and normal butane-containing mixtures are also suitable starting materials. A conveniently treated normal butene-containing hydrocarbon mixture is the butene-butane fraction which may contain, besides one or both normal butenes, isobutene, isobutane and normal butane in varying amounts. Mixtures of the desired olefins with one or more substantially inert materials as nitrogen, paraffins, water vapor, etc. may be treated without separating the normal butenes therefrom. Substantially pure normal butenes or mixtures thereof may be obtained by effecting dehydration of the straight chain butyl alcohols and other suitable means.

The process is executed in the presence of a catalyst consisting of or comprising a phosphorus oxy-acid. Representative phosphorus oxy-acids are orthophosphoric acid ($H_3PO_4$), metaphosphoric acid ($HPO_3$), pyrophosphoric acid ($H_4P_2O_7$), orthophosphorous acid ($H_3PO_3$), hypophosphorous acid ($H_3PO_2$), pyrophosphorous acid ($H_4P_2O_5$), etc. Of the phosphorus oxy-acids, orthophosphoric acid finds general application on account of its isomerizing ability in the reaction, its cheapness, and its availability; it is however to be understood that we may apply any of the other phosphorus oxy-acids alone or in admixture with orthophosphoric acid. Varying concentrations of the phosphorus oxy-acids may be employed from, for example, about 50% to about 100% or such acids containing some free phosphorus oxy-acid anhydrides may be used. The phosphorus oxy-acids may be used as such or in admixture with substantially inert carrier materials, or in admixture with other active isomerization catalysts or agents such as phosphotungstic acid, phosphomolybdic acid, etc.

In the execution of the invention, we prefer to use the phosphorus oxy-acids or mixtures thereof in substantially solid form, this being accomplished by employing said acids in admixture or incorporated with various solid adsorbent materials. Suitable solid adsorbent materials for our purpose are solid materials of predominately siliceous character such as diatomaceous earth, kieselguhr, silica, silica gel and other natural or artificially prepared porous silica materials; aluminum silicate containing materials such as fuller's earth, clays, bentonite, brick screenings, montmorillonite and the like; carbonaceous porous materials as coal, charcoal and the like; and other suitable solid adsorbent materials whether natural or prepared.

Such solid phosphoric acid catalysts may be easily and cheaply prepared by mixing the phosphorus oxy-acid or acids and the solid adsorbent material or materials in the desired proportions, heating (calcining) the resulting mixture up to about 300° C., and grinding and sizing the resultant product to produce catalyst particles of the desired size. The catalyst may be used in any convenient particle size. In general, particle sizes of 4 to 20 mesh are preferred. In a solid catalyst prepared as above described, the phosphorus oxy-acid is probably present in a more or less bound condition.

In using the solid phosphorus oxy-acid catalysts in the process of this invention, only simple equipment is necessary such as a reaction tube or tower in which the solid catalyst is placed as a packing or filler. The temperature of the catalyst mass may be controlled by suitable internal and/or external heating means. The treated materials may or may not be preheated prior to contact with the heated catalyst at the reaction temperature.

The process may be executed with the normal butenes in the liquid or in the vapor phase. It is preferably executed with the butenes in the vapor phase because it is in most cases not desirable to operate at the high pressures which would be required to maintain the normal butenes in the liquid phase at temperatures of 250° C. or higher. Since the use of excessively high pressures results in losses of butenes due to polymerization which is favored by pressure, we preferably execute our isomerization process at subatmospheric, atmospheric or only moderately elevated pressures. In general, pressures below about 5 atmospheres are suitable and preferred.

In many cases, particularly when operating with the reactants in the vapor phase, it is advantageous to operate with water vapor in the reaction mixture. The presence of water vapor in the reaction mixture aids in maintaining the catalyst at a practical optimum activity during the operation, perhaps by preventing or inhibiting dehydration of the phosphorus oxy-acid.

The process is executed at temperatures at least equal to about 250° C., and preferably at temperatures in the range of from about 250° C. to 550° C. At temperatures below about 250° C., substantially no isomerization takes place under the conditions of contact time (not greater than about one minute) and pressure (not greater than about 5 atmospheres) at which the process is executed. At temperatures greater than about 550° C., losses due to polymerization and cracking are prohibitive. In general, when the contact time is from about 2 to 50 seconds and the process is executed in the vapor phase with a solid phosphoric acid catalyst, excellent results may be obtained by using temperatures of from 275° C. to 325° C.

In the execution of the process of this invention, we employ contact times not greater than about one minute, and preferably from about 2 to about 50 seconds. The contact time is calculated from the macroscopic free space in the catalyst and the rate of feed of the gaseous mixture treated. It is computed by simply dividing the macroscopic free space in the catalyst in c. c. by the gas feed in c. c. per second at the reaction temperature and atmospheric pressure. The result is the contact time in seconds. When using contact times not greater than about one minute, temperatures of from 250° C. to 550° C., and pressures below about 5 atmospheres, substantial conversion of the normal butene to isobutene is effected at a practical rate while polymerization of the butenes is substantially obviated.

The following examples illustrate suitable modes of executing the invention. The invention is not to be regarded as restricted to the methods and conditions specified in the illustrative examples.

Example I

A Pyrex glass reaction tube having an internal diameter of about 24 mm. was packed with granules (4 to 10 mesh) of a solid catalyst consisting of a calcined mixture of commercial orthophosphoric acid and kieselguhr. The packed reaction tube contained an apparent volume of about 100 c. c. of the solid catalyst.

The solid phosphoric acid-diatomaceous earth catalyst was prepared by mixing about 82 parts by weight of commercial phosphoric acid (conc. about 89%) with about 18 parts by weight of kieselguhr. The resultant mass was heated at about 250° C. for a short time and then ground and sized to produce granules of about 4 to 10 mesh.

Experiments were made at temperatures of 275° C. and 325° C. and atmospheric pressure at different contact times. In order to avoid a change in water-content of the catalysts during the operations at the different temperatures, which change in water-content might cause a change in catalyst activity, the runs at 275° C. were made with the above-described catalyst which had been previously subjected to a dehydration treatment at about 275° C. under reduced pressure for about 24 hours, and those at 325° C. with a catalyst which had previously been dried under reduced pressure at 325° C. for about the same period of time.

The contact times in the various runs was calculated on the macroscopic free space in the catalyst. This free space was about 48% of the apparent catalyst volume, and was determined by bringing an apparent volume of 100 c. c. of the catalyst (which had previously been impregnated with carbon tetrachloride) into a measuring cylinder having the same diameter as the reaction tube, and measuring the volume of carbon tetrachloride necessary to fill up the free space in the impregnated catalyst.

The runs were made with a gaseous hydrocarbon mixture consisting of about 48.6% by volume of normal butane and about 51.4% by volume of normal butenes.

The gaseous mixture leaving the reaction tube was passed into a condenser kept at about 10° C. for condensation of any polymers formed. The total volume, the total olefin content and the isobutene content of the gaseous mixture discharged from the condenser was then determined.

The results of the runs are given in the following table:

| Temp., °C. | Contact time, seconds | Feed, liters | Exit gas, liters | Olefins in exit gas, percent by volume | Polymer gm./l. feed | Isobutene in exit gas, percent by volume |
|---|---|---|---|---|---|---|
| 325 | 5.00 | 17.00 | 15.9 | 43.5 | 0.20 | 16.5 |
| 325 | 10.80 | 9.17 | 7.5 | 34.5 | 0.38 | 15.5 |
| 275 | 5.40 | 17.00 | 14.0 | 39.5 | 0.53 | 13.0 |
| 275 | 3.70 | 17.00 | 15.1 | 44.0 | 0.30 | 12.0 |
| 275 | 10.00 | 9.17 | 6.2 | 30.0 | 0.75 | 12.5 |
| 325 | 2.05 | 17.00 | 16.1 | 51.0 | 0.00 | 8.0 |
| 325 | 43.60 | 4.60 | 3.6 | 19.5 | 0.54 | 8.3 |
| 275 | 80.00 | 2.45 | 2.4 | 9.2 | 1.45 | 4.7 |

The above data show the influence of the temperature and contact time on the conversion of the normal butene to isobutene.

*Example II*

The following runs were made using the same catalyst and equipment described in Example I. The runs were made at about atmospheric pressure with a gaseous mixture of normal butenes which contained about 3% by volume of isobutene. The n-butene mixture was passed over the catalyst together with an equimolecular amount of water vapor. The results are given in the following table:

| Temp., °C. | Contact time, seconds | Exit hydrocarbon gas Isobutene, percent by volume | Exit hydrocarbon gas n-Butene, Percent by volume |
|---|---|---|---|
| 325 | 24.5 | 40.1 | 57.7 |
| 325 | 25.3 | 36.5 | 59.3 |
| 275 | 28.2 | 28.9 | 65.1 |
| 275 | 26.8 | 28.6 | 57.1 |
| 250 | 27.6 | 6.9 | 91.5 |
| 225 | 31.7 | 6.3 | 91.5 |
| 225 | 20.9 | 7.9 | 90.2 |
| 325 | 10.2 | 33.0 | 64.6 |

The above data show that about 250° C. is about the minimum temperature for practical and economical operation of the process.

The isobutene or isobutene-containing mixtures prepared in accordance with the process of the invention are useful for a wide variety of purposes. They may be used as starting materials in the production of a wide variety of useful products. For example, the mixture of butenes may be treated under such conditions that the isobutene-content thereof is selectively polymerized to diisobutylene which may then be separated and hydrogenated to iso-octane. If desired, the butene mixture can be treated under such conditions that the isobutene interpolymerizes with the n-butenes to yield higher molecular weight products which can be hydrogenated to valuable motor fuels of high octane number. The isobutene can be condensed or polymerized with other olefins as propene, pentenes, hexenes, etc., paraffins, aromatics, diolefins, etc. to yield products useful as motor fuels, resins, lubricating oils, materials for increasing the viscosity index of oils, etc. The isobutene may be hydrated to tertiary butyl alcohol, or it may be chlorinated to isobutenyl chloride, converted to isobutyl chloride, etc.

While we have described our invention in a detailed manner and provided specific examples illustrating suitable modes of executing the same, it is to be understood that modifications may be made and that no limitations other than those imposed by the scope of the appended claims are intended.

We claim as our invention:

1. A process for the conversion of a normal butene to isobutene which comprises contacting the normal butene with a catalyst comprising a phosphorus oxy-acid at a temperature of from about 250° C. to about 550° C. for from 2 to 50 seconds, whereby substantial conversion of the normal butene to isobutene is effected while polymerization of the butenes is substantially obviated.

2. A process for the conversion of a normal butene to isobutene which comprises passing a normal butene while in the gaseous state into contact at a pressure not greater than about 5 atmospheres, with a catalyst comprising a phosphorus oxy-acid at a temperature of from about 250° C. to about 550° C. at such a rate that the contact time is from 2 to 50 seconds, whereby substantial conversion of the normal butene to isobutene is effected while polymerization of the butenes is substantially obviated.

3. A process for the conversion of a normal butene to isobutene which comprises passing a normal butene while in the gaseous state into contact at about atmospheric pressure with a catalyst comprising a phosphorus oxy-acid at a temperature of from about 250° C. to about 550° C. at such a rate that the contact time is from about 2 to about 50 seconds, whereby substantial conversion of the normal butene to isobutene is effected while polymerization of the butenes is substantially obviated.

4. A process for the conversion of a normal butene to isobutene which comprises contacting a hydrocarbon mixture containing at least one normal butene in substantial amount with a catalyst comprising a phosphorus oxy-acid at a temperature of from about 250° C. to about 550° C. for a period of 2 to 50 seconds, whereby substantial conversion of the normal butene content of the mixture is effected while polymerization of the butenes is substantially obviated.

5. A process for the conversion of a normal butene to isobutene which comprises passing a gaseous hydrocarbon mixture containing butene-1 and butene-2 in substantial amounts into contact at a pressure not greater than about 5 atmospheres, with a catalyst comprising a phosphorus oxy-acid at a temperature of from about 250° C. to about 550° C. at such a rate that the contact time is from 2 to 50 seconds, whereby the normal butenes are substantially converted to isobutene while polymerization of the butenes is substantially obviated.

6. A process for the conversion of a normal butene to isobutene which comprises contacting a normal butene with a solid catalyst comprising a phosphorus oxy-acid and a solid adsorbent material at a temperature of from about 250° C. to about 550° C. for a period of 2 to 50 seconds, whereby substantial conversion of the normal butene to isobutene is effected while polymerization of the butenes is substantially obviated.

7. A process for the conversion of a normal butene to isobutene which comprises contacting a normal butene while in the gaseous state with a solid catalyst comprising a calcined mixture of a phosphorus oxy-acid and a solid adsorbent material at a temperature of from about 250° C. to about 550° C. for a period of 2 to 50 seconds, whereby substantial conversion of the normal butene to isobutene is effected while polymerization of the butenes is substantially obviated.

8. A process for the conversion of a normal butene to isobutene which comprises passing a normal butene while in the gaseous state into contact at a pressure not greater than about 5 atmospheres, with a solid catalyst comprising a calcined mixture of a phosphorus oxy-acid and a solid siliceous material at a temperature of from about 250° C. to about 550° C. at such a rate that that the contact time is from 2 to 50 seconds, whereby substantial conversion of the normal butene to isobutene is effected while polymerization of the butenes is substantially obviated.

9. A process for the conversion of a normal butene to isobutene which comprises passing a normal butene while in the gaseous state into contact at about atmospheric pressure with a solid catalyst comprising a calcined mixture of a phosphoric acid and kieselguhr at a temperature of from about 250° C. to about 550° C. at such a rate that the contact time is from about 2 to about 50 seconds, whereby substantial conversion of the normal butene to isobutene is effected while polymerization of the butenes is substantially obviated.

10. A process for the conversion of normal butenes to isobutene which comprises passing a gaseous hydrocarbon mixture containing about 50% by volume of butane and about 50% by volume of normal butenes into contact at about atmospheric pressure with a solid catalyst comprising a calcined mixture of a phosphorus oxy-acid and a solid siliceous material at a temperature of from about 275° C. to about 325° C. at such a rate that the contact time is from about 2 to about 50 seconds, whereby substantial conversion of the normal butenes to isobutene is effected while polymerization of the butenes is substantially obviated.

11. A process for the conversion of n-butenes to iso-butene which comprises isomerizing said n-butenes by subjecting the same at temperatures of the order of 550–750° F. to contact with a catalyst comprising essentially an acid of phosphorous for a time period of the relatively low order of about 2 to 5 seconds.

12. A process for the conversion of n-butenes to iso-butene, which comprises isomerizing said n-butenes by subjecting the same at temperatures of the order of 550–750° F., substantially atmospheric pressure and times of contact of the relatively low order of about 2 to 5 secs. to contact with a catalyst comprising essentially an acid of phosphorous.

13. A process for converting n-butene to isobutene which comprises contacting the n-butene with an acid of phosphorus at a temperature of from about 250 to 550° C. for a time period and under a pressure such that isomerization of the n-butene proceeds at a substantially higher rate than butene polymerization.

14. A process for converting n-butene to isobutene which comprises contacting the n-butene with solid phosphoric acid catalyst at a temperature of from about 250 to 550° C. for a time period and under a pressure such that isomerization of the n-butene proceeds at a substantially higher rate than butene polymerization.

15. A process for converting n-butenes into iso-butene which comprises contacting the n-butenes with solid phosphoric acid catalyst at from 550–750° F., approximately atmospheric pressure and for a time period of the relatively low order of about 2–5 seconds, whereby isomerization of the n-butenes proceeds at a higher rate than polymerization of the n-butenes.

ADRIANUS JOHANNES van PESKI.
HERMANUS FRANS JOSEPH LORANG.